Patented Jan. 8, 1924.

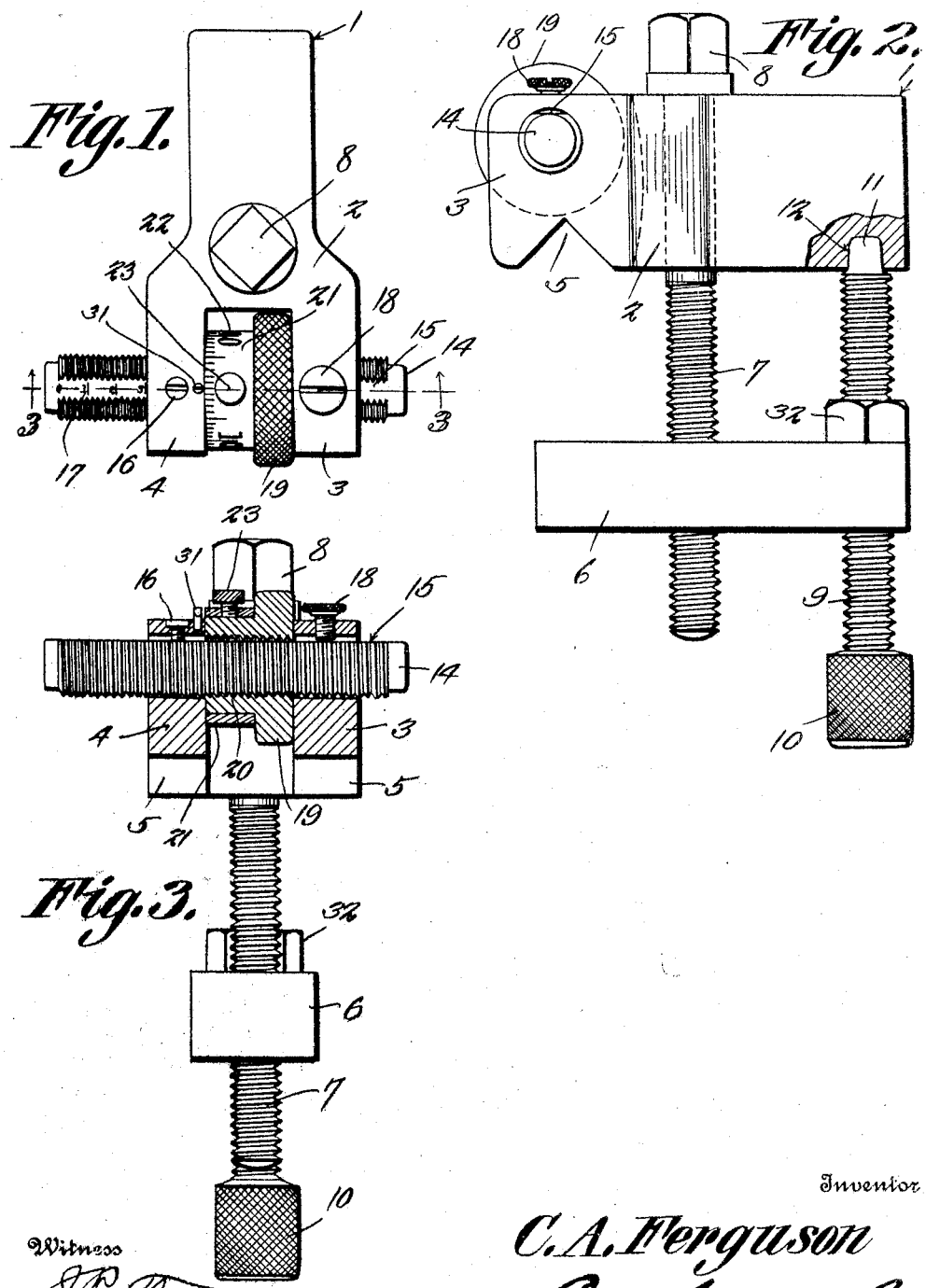

1,480,522

UNITED STATES PATENT OFFICE.

CHARLES A. FERGUSON, OF NORTH EAST, MARYLAND.

STOP FOR CARRIAGES OF METAL-WORKING MACHINES.

Application filed October 15, 1919. Serial No. 330,713.

*To all whom it may concern:*

Be it known that I, CHARLES A. FERGUSON, a citizen of the United States, residing at North East, in the county of Cecil and State of Maryland, have invented a new and useful Stop for Carriages of Metal-Working Machines, of which the following is a specification.

It is the object of this invention to provide a simple but effective means whereby the carriage of a metal working machine, such, for instance, as a lathe, may be stopped at a predetermined point with micrometric exactness.

A mechanic having the disclosure before him may, within the scope of what is claimed, make changes in the precise structure shown, without departing from the spirit of the invention.

In the drawing:—Figure 1 shows in top plan, a device constructed in accordance with the invention; Figure 2 is a side elevation wherein a part has been broken away; Figure 3 is a section on the line 3—3 of Figure 2, the micrometer screw remaining in elevation.

Referring to the drawings, there is provided a support or clamp including a main jaw 1 having an enlarged head 2 bifurcated to form arms 3 and 4, the arms having seats 5 in their lower edges. The clamp includes an auxiliary jaw 6. A first or clamp screw 7 is freely rotatable in the main jaw 1, and has a turning head 8 whereby the screw may be rotated, the head limiting the downward movement of the screw in the main jaw 1. The screw 7 is threaded into the auxiliary jaw 6. A second or thrust screw 9 is threaded into the auxiliary jaw 6 and is provided at its lower end with a turning head 10. A lock nut 32 on the screw 9 coacts with the auxiliary jaw 6 to hold the screw in adjusted positions. The upper end of the screw 9 is reduced as shown at 11 and is received for rotation in an opening 12 fashioned in the lower surface of the main jaw 1.

A micrometer screw 14 slides freely for adjustment in the arms 3 and 4 of the main jaw 1, the screw having a flat side 15 which may be inscribed with a scale 17. A screw 16 is threaded into the arm 4 and cooperates with the flat side 15 of the micrometer screw 14 to prevent the said screw from rotating. A clamp screw 18 is threaded into the arm 3 and coacts with the flat side 15 of the micrometer screw 14 to hold the latter in any position to which it may have been adjusted longitudinally.

A milled micrometer nut 19 fits closely between the arms 3 and 4 of the jaw 1 and is threaded on the micrometer screw 14, the nut including a reduced neck 20 on which a collar 21 is rotatably adjustable, the collar having a scale 22 cooperating with an index 31 carried by the arm 4. A set screw 23 is threaded into the collar 21 and engages the neck 20 of the micrometer nut 19, the purpose of the set screw being to hold the collar in any position to which it may have been adjusted circumferentially. The operation and construction of a micrometer is well understood, but it may be stated that if the thread of the micrometer screw 14 runs twenty turns to the inch, and if the scale 22 on the collar 21 is divided into fifty parts, readings to one one-thousandth of an inch may be taken.

In operation, the bed of a lathe, for instance, is engaged between the jaws 1 and 6, the rib of the bed being received in the seats 5. The screw 7 is tightened up, the screw 9 is advanced, and the lock nut 32 is seated against the jaw 6. Thereupon, the clamp will be held securely in place. The micrometer nut 19 may be rotated, the scale 22 on the collar 21 coacting with the index 31. In this way, the screw 14 may be advanced to any desired extent, to form a precision stop. An approximate reading on the scale 17 may be taken, the ultimate reading being derived from the scale 22. The screw 16 holds the member 14 against rotation and causes the said member to be advanced when the nut 19 is turned. The clamp screw 18 may be advanced at any time to bear on the flat side 15 of the micrometer screw 14, thus holding the micrometer screw in the position to which it has been advanced by the nut 19.

Suppose that it is desired to set up the micrometer screw 14 against the carriage, and then adjust the screw from that point. It is under such circumstances that the rotatably adjustable scale-carrying collar 21 exercises its function. The set screw 23 in the collar 21 may be loosened, after the micrometer screw 14 has been advanced as aforesaid, the collar 21 may be rotated on the neck 20 until the zero of the scale 22 on the collar coincides with the index 31, and then the set screw 23 may be tightened up to hold the collar in its adjusted position.

I claim:—

In a device of the class described, comprising a clamp including a main jaw having arms, a micrometer screw slidable longitudinally in the arms and having a flat longitudinal side, a nut threaded on the screw and located between the arms, a collar rotatable for adjustment on the nut and having a scale, and means for holding the collar in adjusted positions circumferentially of the nut—those improvements which comprise a longitudinal scale inscribed on the flat side of the screw, the flat side being located at the periphery of the screw to render the scale on the flat side readily visible, an adjustable member in one arm and cooperating with the flat side of the screw to hold the screw against rotation but for longitudinal movement, and a clamping device in the other arm and cooperating with the flat side of the screw to hold the screw against rotation at the will of an operator, said one arm exercising a three-fold office, in that it carries an index cooperating with the scale of the collar, in that one edge of said arm forms a second index cooperating with the scale of the screw, and in that said arm supports the adjustable member, the flat side of the screw exercising a three-fold office in that it carries the second specified scale and cooperates both with the adjustable member and with the clamping device.

In testimony that I claim the foregoing as my own, I have hereto affixed my signature in the presence of two witnesses.

CHARLES A. FERGUSON.

Witnesses:
 MARION UNDERWOOD,
 ROBT C. RIEDEN.